(12) United States Patent
Inukai et al.

(10) Patent No.: US 8,093,926 B2
(45) Date of Patent: Jan. 10, 2012

(54) PHYSICAL QUANTITY DETECTION CIRCUIT AND PHYSICAL QUANTITY SENSOR DEVICE

(75) Inventors: Fumihito Inukai, Kyoto (JP); Yoichi Kaino, Osaka (JP)

(73) Assignee: Panasonic Corporation, Osaka (JP)

( * ) Notice: Subject to any disclaimer, the term of this patent is extended or adjusted under 35 U.S.C. 154(b) by 100 days.

(21) Appl. No.: 12/599,779

(22) PCT Filed: Jan. 27, 2009

(86) PCT No.: PCT/JP2009/000302
§ 371 (c)(1),
(2), (4) Date: Nov. 11, 2009

(87) PCT Pub. No.: WO2009/128188
PCT Pub. Date: Oct. 22, 2009

(65) Prior Publication Data
US 2010/0237909 A1    Sep. 23, 2010

(30) Foreign Application Priority Data
Apr. 18, 2008    (JP) ................................ 2008-109215

(51) Int. Cl.
H03K 3/00    (2006.01)
(52) U.S. Cl. ...................................... 327/108
(58) Field of Classification Search ............... None
See application file for complete search history.

(56) References Cited

U.S. PATENT DOCUMENTS

| | | | |
|---|---|---|---|
| 5,289,257 A | 2/1994 | Kurokawa et al. | |
| 5,293,369 A * | 3/1994 | Melas et al. | 369/59.22 |
| 5,379,223 A | 1/1995 | Asplund | |
| 5,594,344 A * | 1/1997 | Doyle et al. | 324/338 |
| 6,943,548 B1 * | 9/2005 | Hertz | 324/309 |
| 7,124,632 B2 | 10/2006 | Smith | |
| 2003/0071634 A1 * | 4/2003 | Johnson et al. | 324/542 |
| 2004/0174832 A1 | 9/2004 | Geiger et al. | |
| 2008/0049108 A1 | 2/2008 | Ebato | |

FOREIGN PATENT DOCUMENTS

| | | |
|---|---|---|
| JP | 01-187512 | 7/1989 |
| JP | 04-072512 | 3/1992 |
| JP | 07-146151 | 6/1995 |
| JP | 2728300 | 12/1997 |
| JP | 10-253359 | 9/1998 |
| JP | 2002-174520 | 6/2002 |
| JP | 2003-021516 | 1/2003 |
| JP | 2003-315356 | 11/2003 |
| JP | 2004-239907 | 8/2004 |
| JP | 2004-526942 | 9/2004 |
| JP | 2005-236589 | 9/2005 |
| JP | 2008-052175 | 3/2008 |

* cited by examiner

Primary Examiner — Lincoln Donovan
Assistant Examiner — Khareem E Almo
(74) Attorney, Agent, or Firm — McDermott Will & Emery LLP (57) ABSTRACT

A physical quantity detection circuit (12) is used for a physical quantity sensor (10) that outputs a sensor signal according to a physical quantity given externally. In the physical quantity detection circuit (12), an analog-to-digital converter (104) converts an analog sensor signal (Ssnc) to a digital sensor signal (Dsnc). A digital filter (100) attenuates a frequency component of the digital sensor signal (Dsnc) that is higher than a predetermined cutoff frequency. A multiplier (106) multiplies a digital sensor signal (Dps) having passed the digital filter (100) by a digital detection signal (Ddet) to detect a digital physical quantity signal (Dphy).

4 Claims, 9 Drawing Sheets

PHYSICAL QUANTITY DETECTION CIRCUIT AND PHYSICAL QUANTITY SENSOR DEVICE

RELATED APPLICATIONS

This application is the U.S. National Phase under 35 U.S.C. §371 of International Application No. PCT/JP2009/000302, filed on Jan. 27, 2009, which in turn claims the benefit of Japanese Application No. 2008-109215, filed on Apr. 18, 2008, the disclosures of which Applications are incorporated by reference herein.

TECHNICAL FIELD

The present invention relates to a physical quantity detection circuit used for a physical quantity sensor that detects a physical quantity given externally and to a physical quantity sensor device provided with the same.

BACKGROUND ART

Conventionally, physical quantity sensor devices capable of detecting a physical quantity (e.g., an angular velocity, an acceleration, etc.) are used in a variety of technical fields such as detection of a shake of a digital camera, attitude control of a mobile unit (e.g., an aircraft, an automobile, a vessel, a robot, etc.), and guidance of a missile and a spacecraft. In general, a physical quantity sensor device includes a physical quantity sensor that outputs a sensor signal in response to a physical quantity given externally and a physical quantity detection circuit that detects the physical quantity sensed by the physical quantity sensor based on the sensor signal supplied from the physical quantity sensor.

In recent years, with the progress of the circuit nanotechnology, digitalization of the physical quantity detection circuit is on its way to further advance. Patent Document 1 discloses a signal processing circuit for a biaxial angular velocity/acceleration sensor, which is composed of digital circuits. In this signal processing circuit, while an analog-to-digital converter circuit converts a sensor signal from the sensor to a digital sensor signal, a sine wave signal generation circuit generates a digital sine wave signal, and a digital multiplier circuit multiplies the digital sensor signal by the digital sine wave signal, to thereby obtain a digital physical quantity signal corresponding to the physical quantity sensed by the physical quantity sensor. Patent Document 2 discloses a capacitive sensor device, in which an analog sensor signal is under-sampled with a sampling frequency that is 1/n (n is an integer) of the carrier frequency of the analog sensor signal, and then subjected to analog-to-digital conversion, to obtain a digital physical quantity signal.

Patent Document 1: Japanese Patent Gazette No. 2728300
Patent Document 2: Japanese Translation of PCT International Application No. 2004-526942

DISCLOSURE OF THE INVENTION

Problems to be Solved by the Invention

However, in Patent Document 1, detection processing is executed for the digital sensor signal on which a noise component is still superimposed. Hence, it is difficult to detect the digital physical quantity signal with high precision. Likewise, in Patent Document 2, in which a noise component is superimposed on the analog sensor signal, it is difficult to acquire a digital sensor signal with high precision.

An object of the present invention is to detect a digital physical quantity signal with high precision by attenuating the noise component of a digital sensor signal.

Means for Solving the Problems

According to one aspect of the invention, a physical quantity detection circuit is a physical quantity detection circuit used for a physical quantity sensor that outputs a sensor signal according to a physical quantity given externally, the circuit including: an analog-to-digital converter circuit configured to convert the sensor signal to a digital sensor signal; a digital filter configured to attenuate a frequency component of the digital sensor signal obtained by the analog-to-digital converter circuit that is higher than a predetermined cutoff frequency; and a multiplier circuit configured to multiply a digital sensor signal having passed the digital filter by a digital detection signal corresponding to a sine wave signal to detect a digital physical quantity signal corresponding to the physical quantity. In this physical quantity detection circuit, the noise component of the digital sensor signal is attenuated before execution of the detection processing, and hence, the detection precision of the digital physical quantity signal can be improved.

Preferably, the physical quantity detection circuit described above further includes: a down-sampling circuit interposed between the digital filter and the multiplier circuit, wherein the analog-to-digital converter circuit over-samples the sensor signal to convert the sensor signal to the digital sensor signal, and the down-sampling circuit decreases the sampling frequency of the digital sensor signal received from the digital filter and supplies the resultant signal to the multiplier circuit. In this physical quantity detection circuit, the number of sine wave data units constituting the digital detection signal can be small. Hence, the storage area for storing the sine wave data can be reduced, and also the processing burden on the multiplier circuit can be reduced. In addition, since the sampling frequency of the digital physical quantity signal is also reduced, the circuit scale and power consumption of a digital filter, which may be placed downstream of the multiplier circuit, can be reduced.

Preferably, the physical quantity detection circuit described above further includes: an interpolation filter configured to increase the sampling frequency of a digital physical quantity signal received from the multiplier circuit; a digital-to-analog converter circuit configured to convert a digital physical quantity signal received from the interpolation filter to an analog physical quantity signal; and an analog low-pass filter configured to attenuate a frequency component of the analog physical quantity signal obtained by the digital-to-analog converter circuit that is higher than a predetermined cutoff frequency. In this physical quantity detection circuit, the analog physical quantity signal can be outputted. Moreover, with the placement of the interpolation filter, the circuit scale of the analog low-pass filter can be reduced.

Preferably, the tap coefficients of the digital filter are changeable. In this physical quantity detection circuit, the phase of the digital sensor signal can be adjusted by changing the tap coefficients of the digital filter. With this, a deviation in phase between the digital sensor signal and the digital detection signal can be corrected, and hence, the detection precision of the digital physical quantity signal can be improved.

Effect of the Invention

As described above, the digital physical quantity signal can be detected with high precision.

DESCRIPTION OF REFERENCE CHARACTERS

10 Physical quantity sensor
11 Drive circuit
12, 22, 32, 42 Physical quantity detection circuit
101 Wave shaping circuit
102 Frequency multiplication circuit
103 Input amplifier
104 Analog-to-digital converter
105 Detection signal generator
106 Multiplier
107 Digital filter
100 Digital filter
102b Frequency division circuit
200 Down-sampling circuit
301 Interpolation filter
302 Digital-to-analog converter
303 Analog low-pass filter
400 Digital filter

BEST MODE FOR CARRYING OUT THE INVENTION

Preferred embodiments will be described in detail hereinafter with reference to the accompanying drawings. It should be noted that identical or equivalent components are denoted by the same reference characters throughout the drawings, and description thereof will not be repeated.

Embodiment 1

Figure 1:
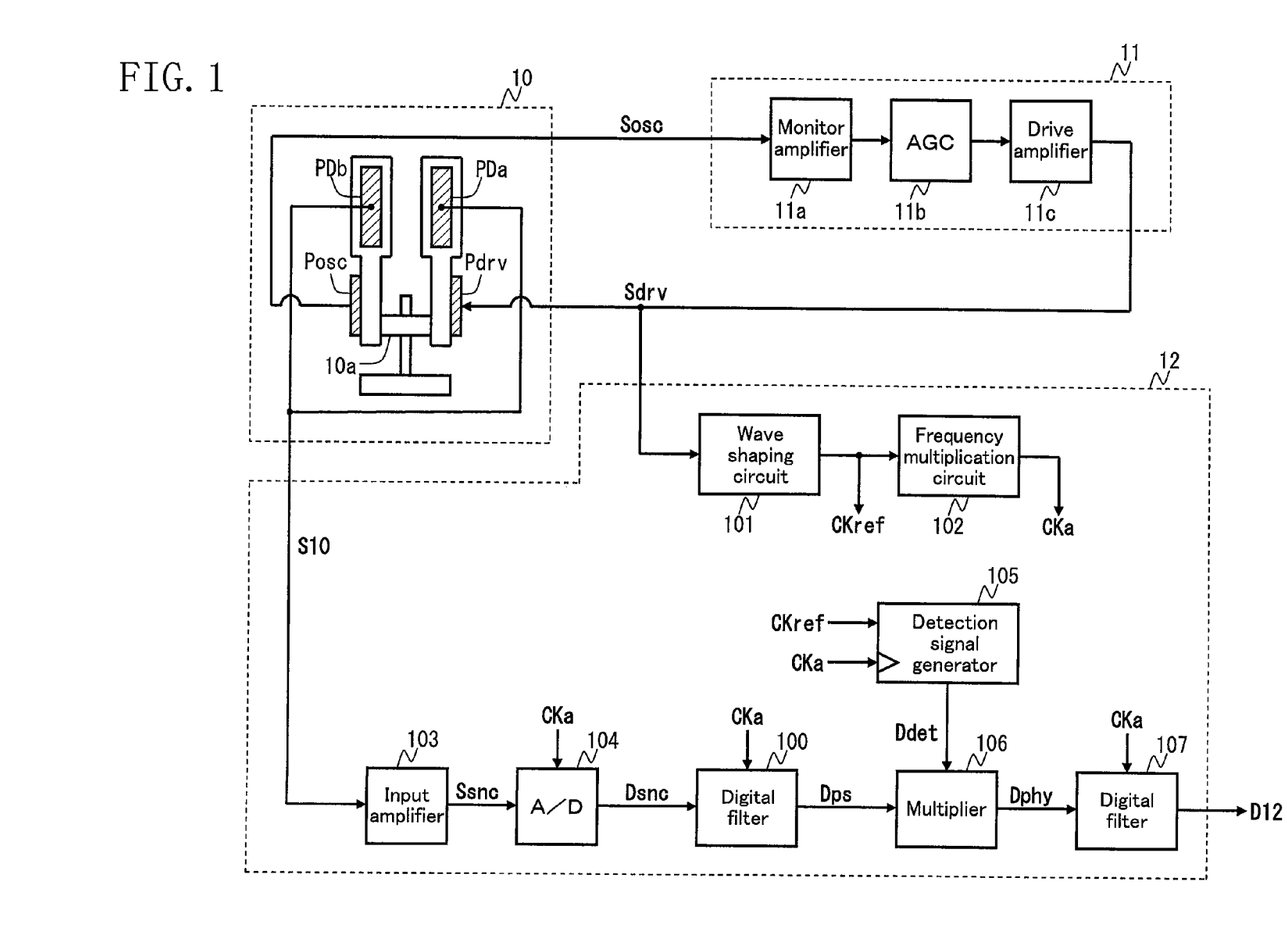
FIG. 1 is a view showing an example configuration of a physical quantity sensor device of Embodiment 1.

FIG. 1 shows a configuration of a physical quantity sensor device of Embodiment 1 of the present invention. This physical quantity sensor device includes a physical quantity sensor 10, a drive circuit 11, and a physical quantity detection circuit 12.

[Physical Quantity Sensor]

The physical quantity sensor 10 receives a drive signal Sdrv having a predetermined frequency from the drive circuit 11, and outputs a sensor signal S10 according to a physical quantity (e.g., an angular velocity, an acceleration, etc.) given externally. The frequency of the sensor signal S10 corresponds to the frequency of the drive signal Sdrv. For example, the center frequency (carrier frequency) of the sensor signal S10 is equal to the frequency of the drive signal Sdrv. Assume herein that the physical quantity sensor 10 is a tuning fork type angular velocity sensor. The physical quantity sensor 10 includes a tuning fork body 10a, a drive piezoelectric element Pdrv, an oscillation detection piezoelectric element Posc, and angular velocity detection piezoelectric elements PDa and PDb. The tuning fork body 10a has two prongs each twisted by the right angle in the center, a connection for connecting the two prongs at their ends on one side, and a support pin provided at the connection to serve as a rotation axis. The drive piezoelectric element Pdrv oscillates one prong according to the frequency and amplitude of the drive signal Sdrv supplied from the drive circuit 11, causing resonance of the two prongs. With this oscillation of the tuning fork, charge is generated in the oscillation detection piezoelectric element Posc (i.e., an oscillation signal Sosc is generated). Also, once a rotational angular velocity occurs, an amount of charge responsive to the rotational angular velocity (Coriolis force) is generated in the angular velocity detection piezoelectric elements PDa and PDb (i.e., the sensor signal S10 is generated).

[Drive Circuit]

The drive circuit 11 supplies the drive signal Sdrv to the physical quantity sensor 10. Also, the drive circuit 11 adjusts the frequency and amplitude of the drive signal Sdrv according to the oscillation signal Sosc from the physical quantity sensor 10. In the drive circuit 11, a monitor amplifier 11a converts the oscillation signal Sosc from the physical quantity sensor 10 to a voltage. An automatic gain control amplifier (AGC) 11b amplifies or attenuates the output of the monitor amplifier 11a, and also changes its amplification gain so that the voltage supplied to a drive amplifier 11c should be kept constant. The drive amplifier 11c controls the frequency and amplitude of the drive signal Sdrv according to the output of the AGC 11b. In this way, with the adjustment of the drive signal Sdrv according to the oscillation signal Sosc, the maximum oscillation amplitude and oscillation frequency of the physical quantity sensor 10 are kept constant.

[Physical Quantity Detection Circuit]

The physical quantity detection circuit 12 detects the physical quantity sensed by the physical quantity sensor 10 based on the sensor signal S10 from the physical quantity sensor 10. The physical quantity detection circuit 12 includes a wave shaping circuit 101, a frequency multiplication circuit 102, an input amplifier 103, an analog-to-digital converter (A/D) 104, a digital filter 100, a detection signal generator 105, a multiplier 106, and a digital filter 107.

The wave shaping circuit 101 converts the drive signal Sdrv to a square wave and outputs the resultant signal as a reference clock CKref. The wave shaping circuit 101 includes a comparator or an inverter, for example. The frequency of the reference clock CKref is substantially the same as the frequency of the drive signal Sdrv (i.e., the frequency of the sensor signal S10). The frequency multiplication circuit 102 multiplies the reference clock CKref from the wave shaping circuit 101 to output an operation clock CKa having a frequency higher than that of the reference clock CKref (herein, a frequency twice as high as that of the reference clock CKref). The frequency multiplication circuit 102 is composed of a phase locked loop (PLL), for example.

The input amplifier 103 converts the sensor signal S10 received from the physical quantity sensor 10 to a voltage and outputs the resultant signal as an analog sensor signal Ssnc. The analog-to-digital converter 104 samples the analog sensor signal Ssnc in synchronization with the operation clock CKa from the frequency multiplication circuit 102 and converts sampled analog values (amplitude values) to digital values. In other words, the analog-to-digital converter 104 over-samples the analog sensor signal Ssnc. In this way, the analog sensor signal Ssnc is converted to a digital sensor signal Dsnc that contains a plurality of digital values.

The digital filter 100, operating in synchronization with the operation clock CKa from the frequency multiplication circuit 102, attenuates a frequency component of the digital sensor signal Dsnc from the analog-to-digital converter 104 that is higher than a predetermined cutoff frequency, while outputting a low-frequency component thereof as a digital sensor signal Dps. The digital filter 100 is an infinite impulse response (IIR) digital filter or a finite impulse response (FIR) digital filter, for example. The frequency characteristic (e.g., the cutoff frequency) and phase characteristic of the digital filter 100 are determined by the tap coefficients of the digital filter 100.

The detection signal generator 105, operating in synchronization with the operation clock CKa from the frequency multiplication circuit 102, generates a digital detection signal Ddet corresponding to a sine wave signal in response to a transition edge (herein, a rising edge) of the reference clock CKref from the wave shaping circuit 101. The digital detection signal Ddet contains a plurality of sine wave units, which respectively correspond to a plurality of analog values (amplitude values) obtained by sampling a sine wave signal having a predetermined frequency (e.g., the drive signal Sdrv) in synchronization with a predetermined clock (e.g., the operation clock CKa) (see FIG. 2). For example, the plurality of sine wave data units indicate ideal amplitude values expressed by a sine function.

The multiplier 106 multiplies the digital sensor signal Dps from the digital filter 100 by the digital detection signal Ddet generated by the detection signal generator 105. With this multiplication, a digital physical quantity signal Dphy (signal corresponding to the physical quantity sensed by the physical quantity sensor 10) is detected. The digital filter 107, operating in synchronization with the operation clock CKa from the frequency multiplication circuit 102, allows only a low-frequency component of the digital physical quantity signal Dphy detected by the multiplier 106 to pass therethrough as a digital physical quantity signal D12 for noise removal and the like.

[Operation]

Figure 2:
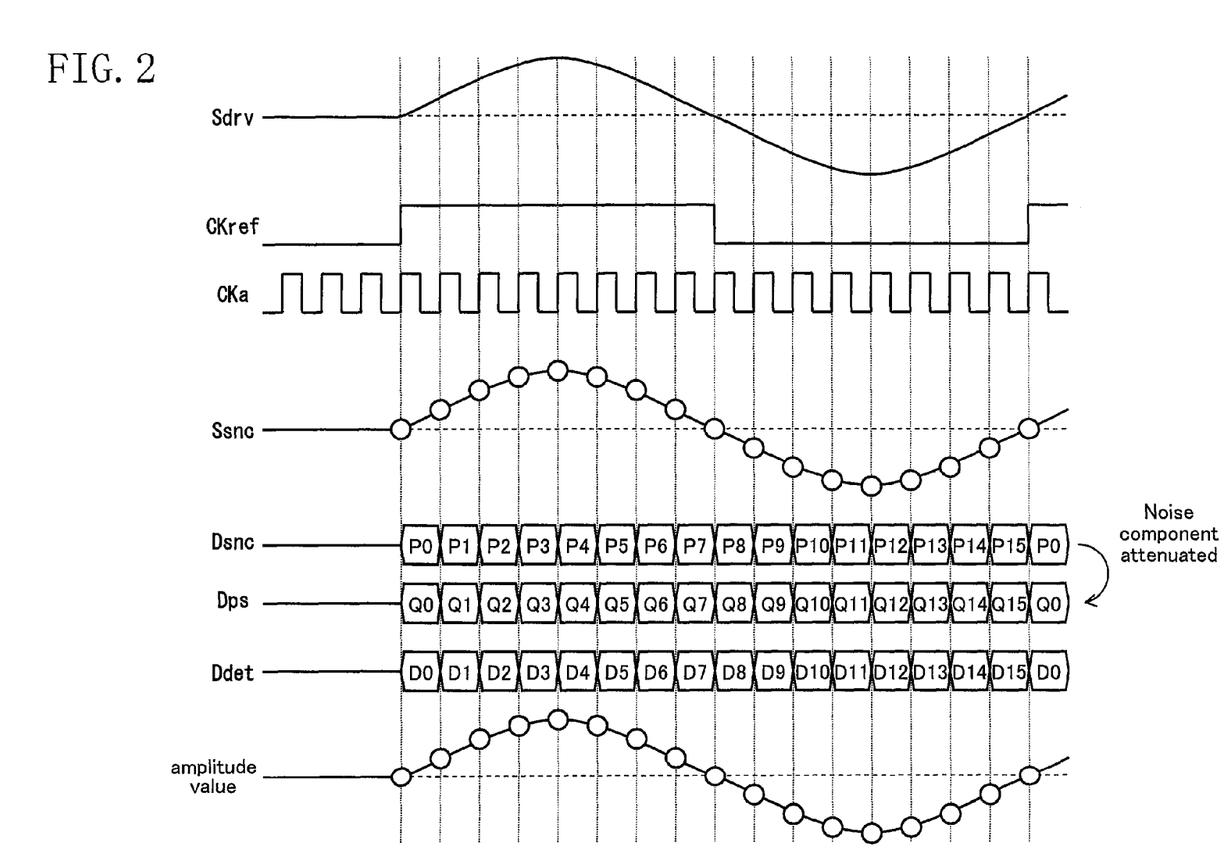
FIG. 2 is a timing chart illustrating the operation of a physical quantity detection circuit shown in FIG. 1.

Next, the operation of the physical quantity detection circuit 12 shown in FIG. 1 will be described with reference to FIG. 2.

The wave shaping circuit 101 converts the drive signal Sdrv to the reference clock CKref, and the frequency multiplication circuit 102 generates the operation clock CKa based on the reference clock CKref. The analog-to-digital converter 104 converts the analog sensor signal Ssnc to digital values P0, P1, P2, . . . in synchronization with the operation clock CKa. The digital filter 100 filters the digital sensor signal Dsnc to change the digital values P0, P1, P2, . . . of the digital sensor signal Dsnc to digital values Q0, Q1, Q2, . . . . In this way, the noise component of the digital sensor signal Dsnc is attenuated. The detection signal generator 105 outputs sine wave data units D0, D1, D2, . . . sequentially in response to a transition edge of the reference clock CKref. The multiplier 106 multiplies the digital values Q0, Q1, Q2, . . . by the sine wave data units D0, D1, D2, . . . .

As described above, the noise component of the digital sensor signal Dsnc is attenuated before execution of the detection processing, and hence the detection precision of the digital physical quantity signal can be improved.

Embodiment 2

In general, as the difference between the cutoff frequency of a digital filter and the sampling frequency of a digital signal supplied to the digital filter is greater, the number of taps constituting the digital filter must be greater. For this reason, the sampling frequency of the digital signal supplied to the digital filter is preferably made low.

Figure 3:
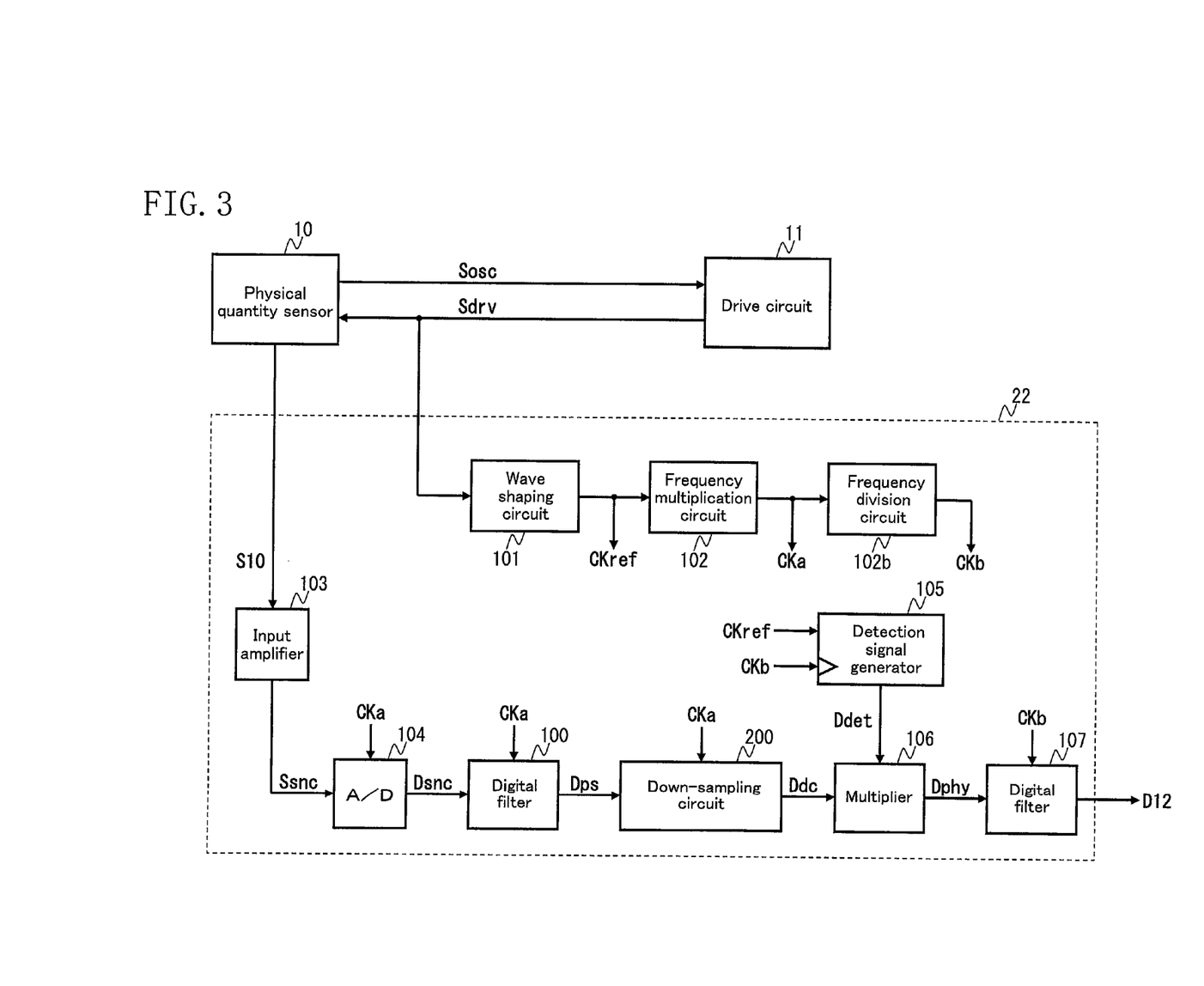
FIG. 3 is a view showing an example configuration of a physical quantity sensor is device of Embodiment 2.

FIG. 3 shows a configuration of a physical quantity sensor device of Embodiment 2 of the present invention. This physical quantity sensor device includes a physical quantity detection circuit 22 in place of the physical quantity detection circuit 12 shown in FIG. 1. The physical quantity detection circuit 22 includes a frequency division circuit 102b and a down-sampling circuit 200 in addition to the components shown in FIG. 1. The other configuration is similar to that in FIG. 1.

The frequency division circuit 102b divides the frequency of the operation clock CKa from the frequency multiplication circuit 102 to generate an operation clock CKb having a frequency lower than that of the operation clock CKa. The down-sampling circuit 200, operating in synchronization with the operation clock CKa from the frequency multiplication circuit 102, executes down-sampling processing (decimation of digital values, etc.) for the digital sensor signal Dps from the digital filter 100, to convert the digital sensor signal Dps corresponding to the operation clock CKa to a digital sensor signal Dpc corresponding to the operation clock CKb. In other words, the down-sampling circuit 200 decreases the sampling frequency of the digital sensor signal Dps. The detection signal generator 105 and the digital filter 107 operate in synchronization with the operation clock CKb from the frequency division circuit 102b. The multiplier 106 multiplies the digital sensor signal Ddc from the down-sampling circuit 200 by the digital detection signal Ddet.

Figure 4:
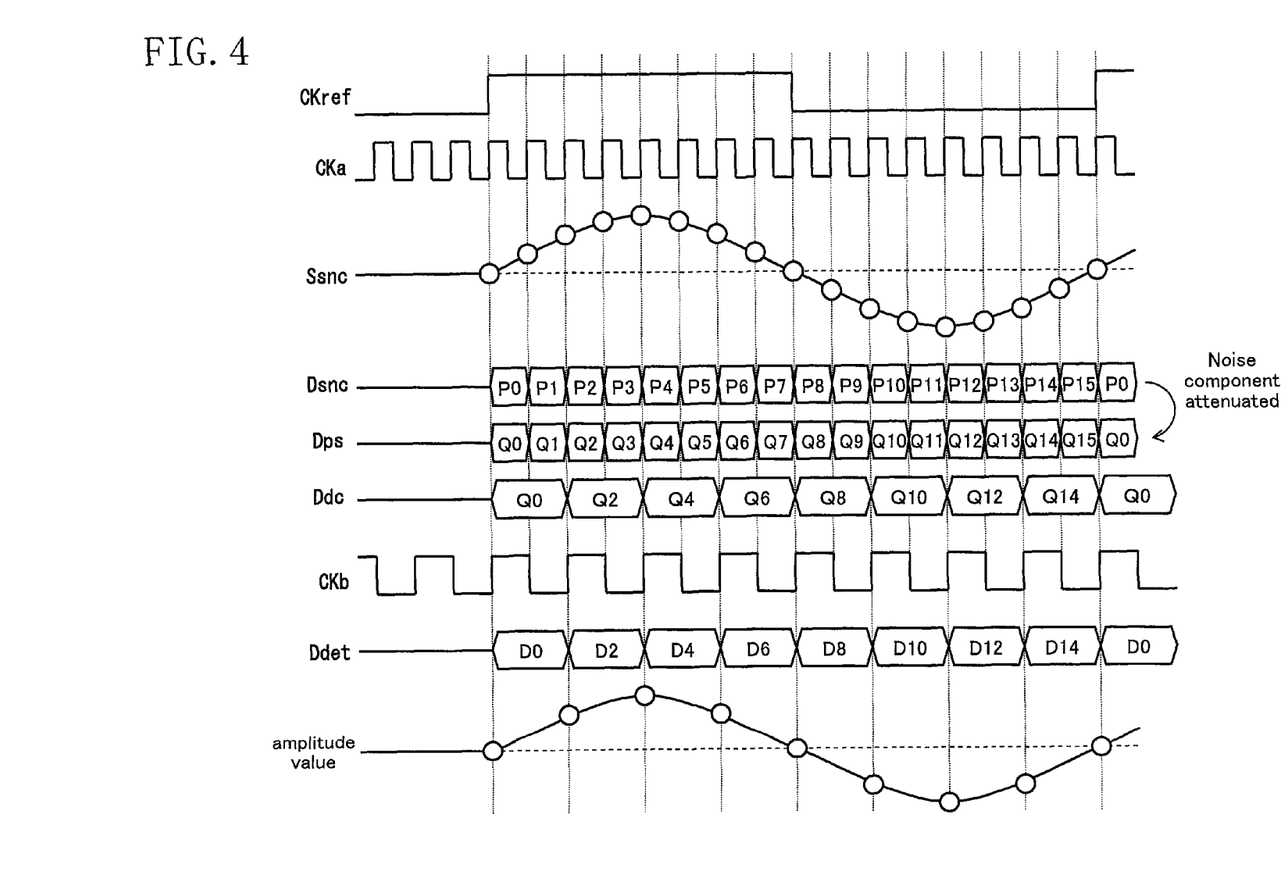
FIG. 4 is a timing chart illustrating the operation of a physical quantity detection circuit shown in FIG. 3.

For example, as shown in FIG. 4, the down-sampling circuit 200 decimates the digital sensor signal Dps having passed the digital filter 100, eliminating the digital values Q1, Q3, Q5, . . . , to generate the digital sensor signal Ddc. The detection signal generator 105 outputs sine wave data units D0, D2, D4, . . . sequentially in response to a transition edge of the reference clock CKref. The multiplier 106 multiplies the digital values Q0, Q2, Q4, . . . by the sine wave data units D0, D2, D4, . . . .

As described above, by decreasing the sampling frequency of the digital sensor signal Dps with the down-sampling circuit 200, the sampling frequency of the digital physical quantity signal Dphy supplied to the digital filter 107 can also be decreased. In this embodiment, therefore, the circuit scale and power consumption of the digital filter 107 can be reduced compared with the physical quantity detection circuit 12 shown in FIG. 1.

Moreover, with the reduction in the number of sine wave data units constituting the digital detection signal Ddet, the storage area (e.g., a memory not shown) for storing the sine wave data can be reduced, and also the processing burden on the multiplier 106 can be reduced.

Embodiment 3

Figure 5:
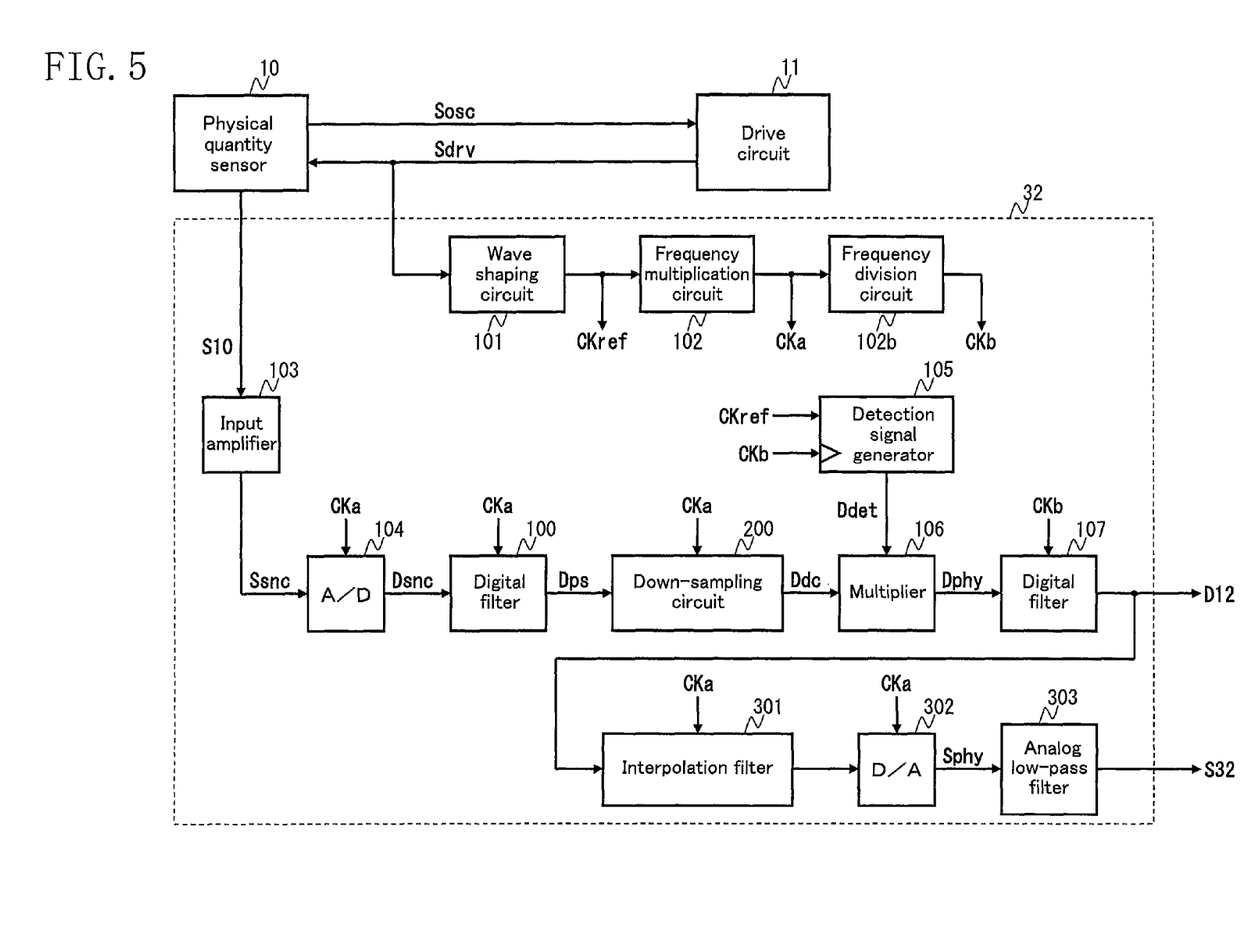
FIG. 5 is a view showing an example configuration of a physical quantity sensor device of Embodiment 3.

FIG. 5 shows a configuration of a physical quantity sensor device of Embodiment 3 of the present invention. This physical quantity sensor device includes a physical quantity detection circuit 32 in place of the physical quantity detection circuit 22 shown in FIG. 3. The physical quantity detection circuit 32 includes an interpolation filter 301, a digital-to-analog converter (D/A) 302, and an analog low-pass filter 303 in addition to the components shown in FIG. 3. The other configuration is similar to that in FIG. 3.

The interpolation filter 301, operating in synchronization with the operation clock CKa from the frequency multiplication circuit 102, executes interpolation processing (interpolation of digital values, straight line approximation, etc.) for the digital physical quantity signal D12 from the digital filter 107, to convert the digital physical quantity signal D12 corresponding to the operation clock CKb to a digital physical quantity signal corresponding to the operation clock CKa. In other words, the interpolation filter 301 increases the sampling frequency of the digital physical quantity signal D12. Assume herein that the up-sampling ratio in the interpolation filter 301 corresponds to the down-sampling ratio in the down-sampling circuit 200. For example, when the down-sampling ratio is "128:2", the up-sampling ratio should be "2:128."

The digital-to-analog converter 302, operating in synchronization with the operation clock CKa, converts the digital physical quantity signal from the interpolation filter 301 to an analog physical quantity signal Sphy. The analog low-pass filter 303 attenuates a frequency component of the analog physical quantity signal Sphy from the digital-to-analog converter 302 that is higher than a predetermined cutoff frequency, to output a low frequency component thereof as an analog physical quantity signal S32.

Figure 6:
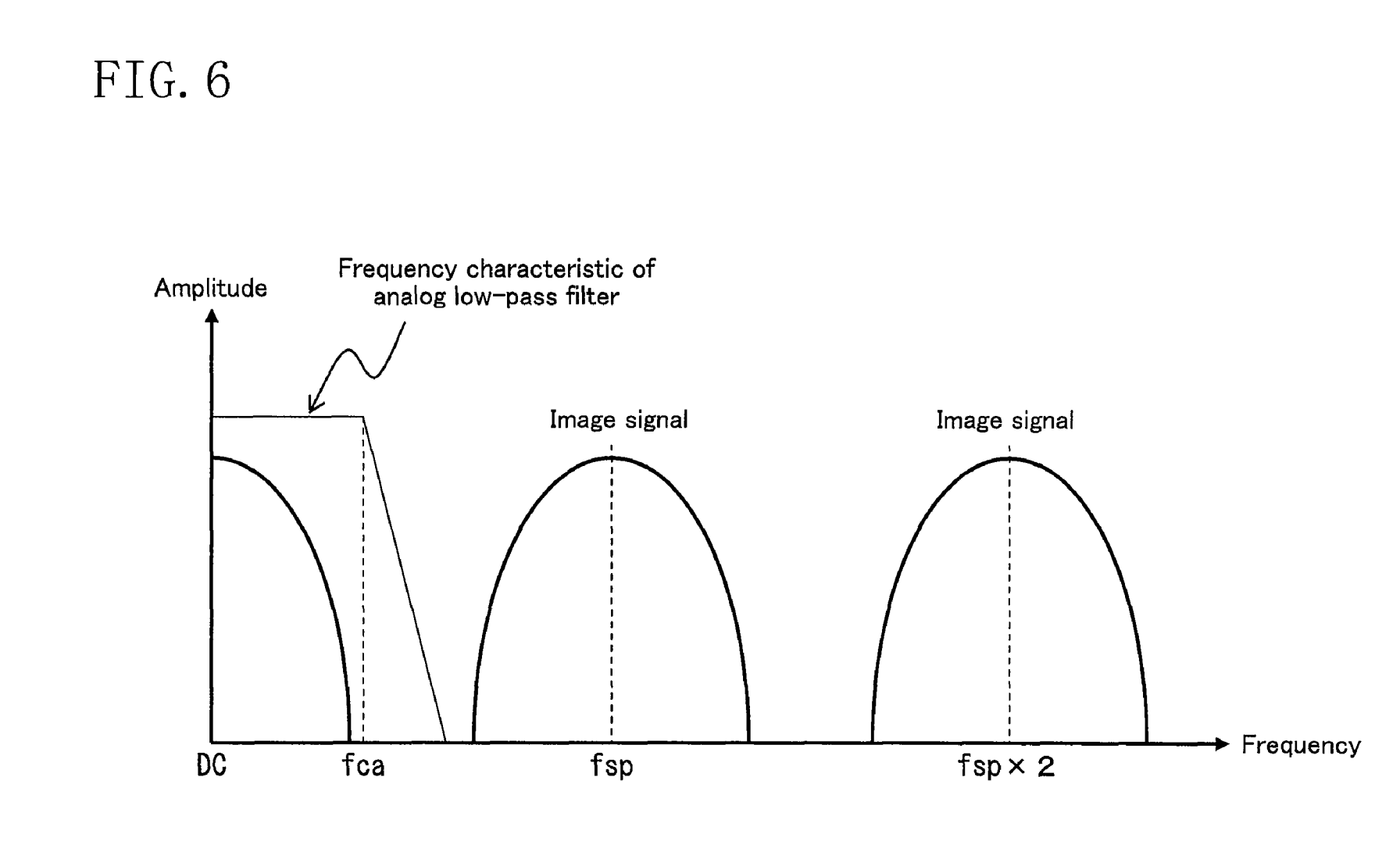
FIG. 6 is a frequency distribution chart for illustration of an analog physical quantity signal obtained by a digital-to-analog converter shown in FIG. 5.

As shown in FIG. 6, the analog physical quantity signal Sphy obtained by the digital-to-analog converter 302 includes image signals having frequencies that are an integral multiple of the sampling frequency fsp of the digital physical quantity signal supplied to the digital-to-analog converter 302. For this reason, as the difference between the cutoff frequency fca of the analog low-pass filter 303 and the sampling frequency fsp of the digital physical quantity signal supplied to the digital-to-analog converter 302 is smaller, the order of the analog low-pass filter 303 must be made higher to ensure a steep attenuation characteristic for the analog low-pass filter 303 (to increase the attenuation slope of the analog low-pass filter 303). In the physical quantity detection circuit 32 in this embodiment, in which the sampling frequency fsp of the digital physical quantity signal is increased by the interpolation filter 301, the burden on the analog low-pass filter 303 can be reduced, and as a result, the circuit scale of the analog low-pass filter 303 can be reduced.

As described above, not only the digital physical quantity signal D12 but also the analog physical quantity signal S32 can be outputted. Moreover, with the placement of the interpolation filter 301, the circuit scale of the analog low-pass filter 303 can be reduced.

Note that the up-sampling ratio in the interpolation filter 301 does not have to correspond to the down-sampling ratio in the down-sampling circuit 200. Also, the physical quantity detection circuit 32 does not have to include the down-sampling circuit 200.

Embodiment 4

Figure 7:
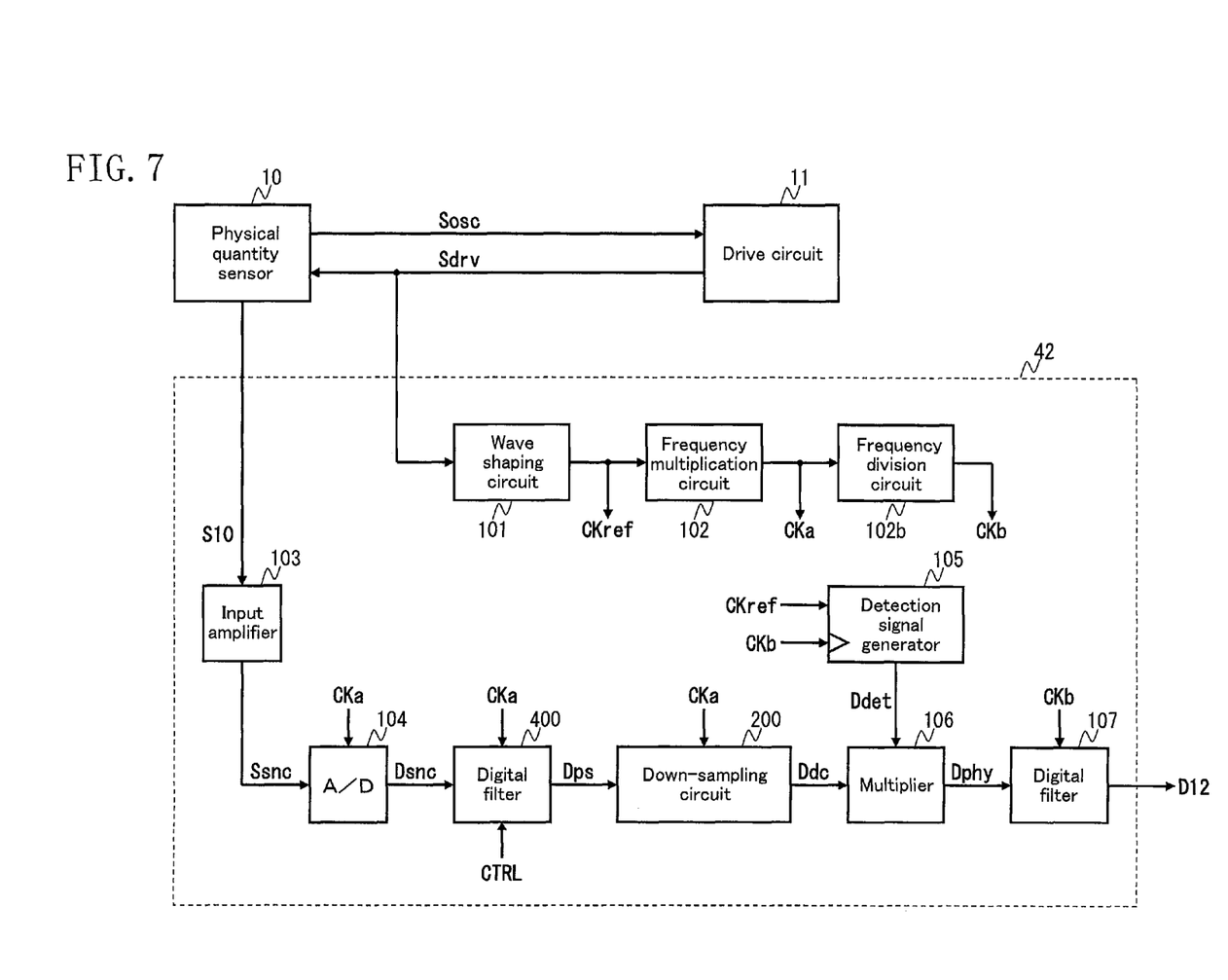
FIG. 7 is a view showing an example configuration of a physical quantity sensor device of Embodiment 4.

FIG. 7 shows a configuration of a physical quantity sensor device of Embodiment 4 of the present invention. This physical quantity sensor device includes a physical quantity detection circuit 42 in place of the physical quantity detection circuit 22 shown in FIG. 3. The physical quantity detection circuit 42 includes a digital filter 400 in place of the digital filter 100 shown in FIG. 3. The other configuration is similar to that in FIG. 3.

The digital filter 400, operating in synchronization with the operation clock CKa from the frequency multiplication circuit 102, attenuates a frequency component of the digital sensor signal Dsnc from the analog-to-digital converter 104 that is higher than a predetermined cutoff frequency, while outputting a low-frequency component thereof as a digital sensor signal Dps. Also, the tap coefficients of the digital filter 400 are changeable under external control CTRL. That is, the frequency characteristic and phase characteristic of the digital filter 400 are changeable under the external control CTRL.

Figure 8:
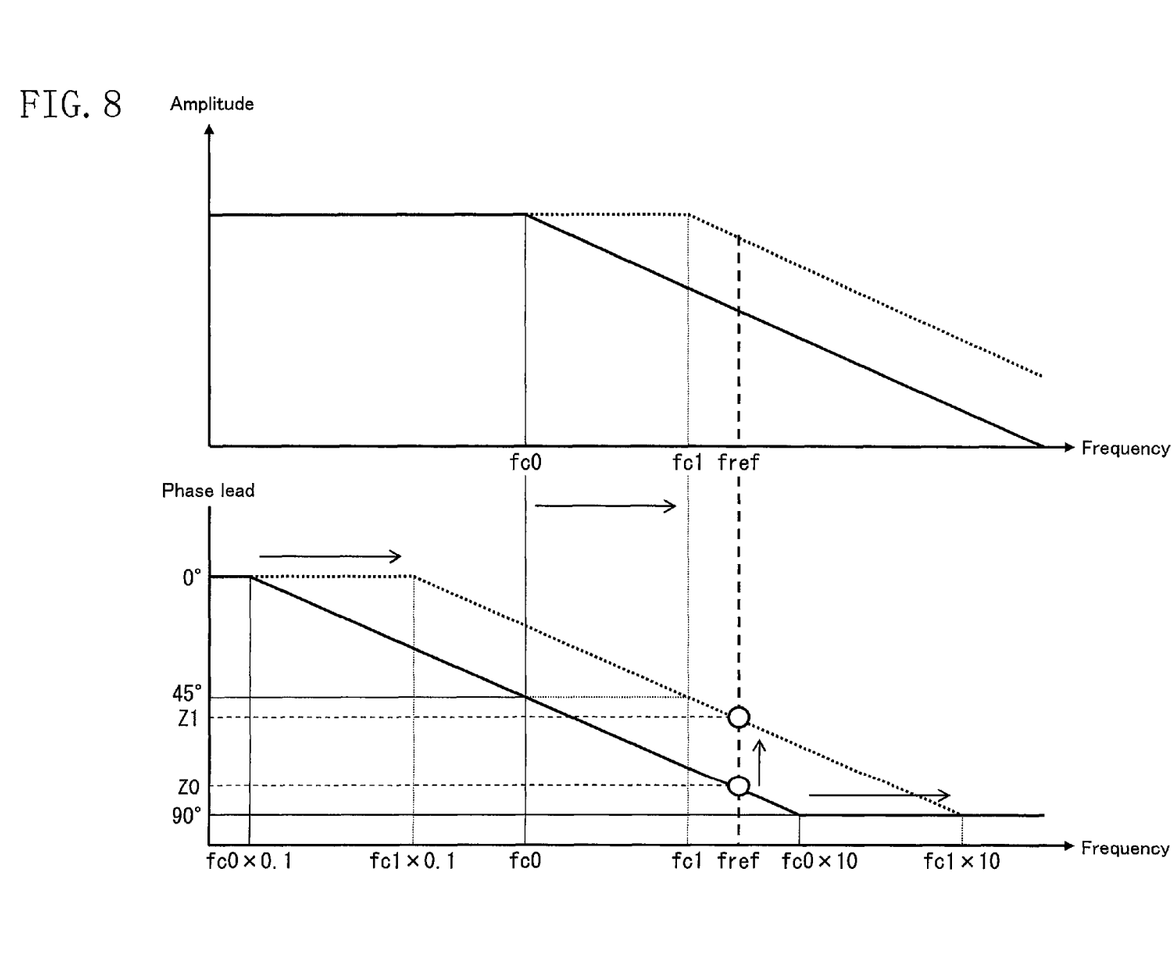
FIG. 8 is a view for illustration of the frequency characteristic and phase characteristic of a digital filter shown in FIG. 7.

Referring to FIG. 8, changes of the characteristics of the digital filter 400 shown in FIG. 7 will be described. The "fref" in FIG. 7 refers to the frequency of the reference clock CKref (i.e., the center frequency of the sensor signal S10). When the tap coefficients of the digital filter 400 are changed to increase the cutoff frequency of the digital filter 400 from "fc0" to "fc1," the phase lead in the digital filter 400 decreases from "Z0" to "Z1." In this way, with the change in the tap coefficients of the digital filter 400, the phase lead in the digital filter 400 also changes.

As described above, by changing the phase lead in the digital filter 400, the phase of the digital sensor signal Dps can be adjusted. Hence, since a deviation in phase between the digital sensor signal Dps and the digital detection signal Ddet can be corrected, the detection precision of the digital physical quantity signal can be improved.

The physical quantity detection circuit 42 does not have to include the down-sampling circuit 200. Also, the physical quantity detection circuit 42 may further include the interpolation filter 301, the digital-to-analog converter 302, and the analog low-pass filter 303 shown in FIG. 5.

Other Embodiments

In the embodiments described above, the digital filters 100, 107, and 400 may be a digital low-pass filter or a digital band-pass filter.

Figure 9:
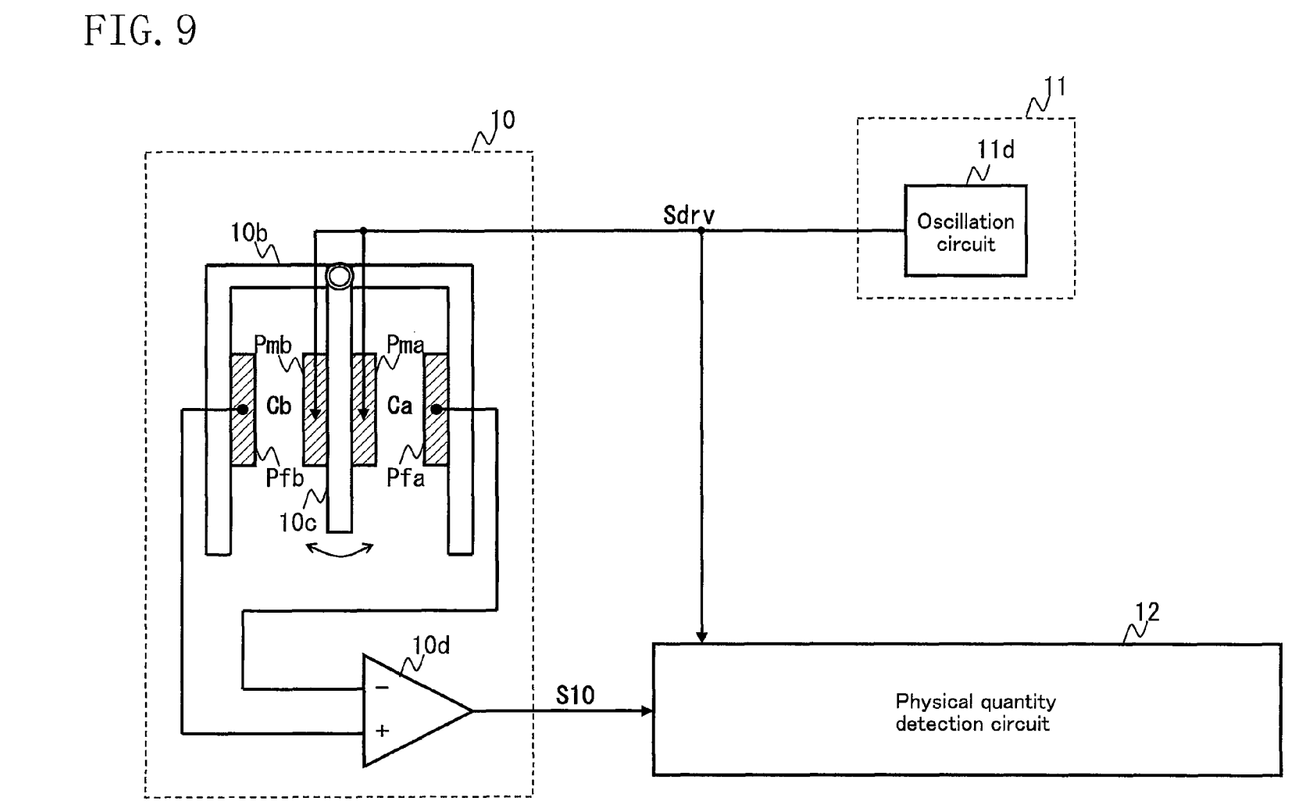
FIG. 9 is a view showing an alteration of a physical quantity sensor.

The physical quantity sensor 10 does not have to be of the tuning fork type, but may be of a circular cylinder type, a regular triangular prism type, a square prism type, or a ring type, or may be of another shape. Otherwise, as shown in FIG. 9, the physical quantity sensor 10 may be a capacitive acceleration sensor. In this case, the physical quantity sensor 10 includes a fixed portion 10b, a movable portion 10c, movable electrodes Pma and Pmb, detection electrodes Pfa and Pfb, and a differential amplifier 10d. The movable portion 10c is connected to the fixed portion 10b so that it can be displaced according to acceleration. The movable electrodes Pma and Pmb are placed on the movable portion 10c. The detection electrode Pfa and Pfb are placed on the fixed portion 10b so as to face the movable electrodes Pma and Pmb, respectively. That is, the movable electrode Pma and the detection electrode Pfa constitute a capacitor Ca, and the movable electrode Pmb and the detection electrode Pfb constitute a capacitor Cb. A drive signal Sdrv from an oscillation circuit 11d is supplied to the capacitors Ca and Cb. The differential amplifier 10d outputs a sensor signal S10 corresponding to the difference between the charge amounts generated in the detection electrodes Pfa and Pfb. Once acceleration occurs, one of the capacitances of the capacitors Ca and Cb increases while the other decreases, due to a displacement of the movable portion 10c. This causes a difference in charge amount between the detection electrodes Pfa and Pfb, and the sensor signal S10 corresponding to this difference is outputted.

INDUSTRIAL APPLICABILITY

The present invention can provide precise detection of a digital physical quantity signal, and hence is suitable for a physical quantity sensor (e.g., a tuning fork type angular velocity sensor, a capacitive acceleration sensor, etc.) used in a mobile unit, a cellular phone, a digital camera, a game machine, and the like.

The invention claimed is:

1. A physical quantity detection circuit used for a physical quantity sensor that outputs a sensor signal according to a physical quantity given externally, the circuit comprising:
   an analog-to-digital converter circuit configured to convert the sensor signal to a digital sensor signal;
   a digital filter configured to attenuate a frequency component of the digital sensor signal obtained by the analog-to-digital converter circuit that is higher than a predetermined cutoff frequency;
   a multiplier circuit configured to multiply a digital sensor signal having passed the digital filter by a digital detection signal corresponding to a sine wave signal to detect a digital physical quantity signal corresponding to the physical quantity;
   an interpolation filter configured to increase the sampling frequency of a digital physical quantity signal received from the multiplier circuit;
   a digital-to-analog converter circuit configured to convert a digital physical quantity signal received from the interpolation filter to an analog physical quantity signal; and
   an analog low-pass filter configured to attenuate a frequency component of the analog physical quantity signal obtained by the digital-to-analog converter circuit that is higher than a predetermined cutoff frequency.

2. The physical quantity detection circuit of claim 1, further comprising:
   a down-sampling circuit interposed between the digital filter and the multiplier circuit,
   wherein the analog-to-digital converter circuit over-samples the sensor signal to convert the sensor signal to the digital sensor signal, and
   the down-sampling circuit decreases the sampling frequency of the digital sensor signal received from the digital filter and supplies the resultant signal to the multiplier circuit.

3. The physical quantity detection circuit of claim 1, wherein tap coefficients of the digital filter are changeable.

4. A physical quantity sensor device comprising:
   the physical quantity detection circuit of claim 1;
   the physical quantity sensor; and
   a drive circuit configured to supply a drive signal having a predetermined frequency to the physical quantity sensor,
   wherein the frequency of the sensor signal corresponds to the frequency of the drive signal.

* * * * *